United States Patent
Szum et al.

(10) Patent No.: US 6,319,549 B1
(45) Date of Patent: Nov. 20, 2001

(54) RIBBON UNIT, A METHOD OF MAKING THE RIBBON UNIT, AND A METHOD OF PROVIDING MID-SPAN ACCESS

(75) Inventors: David M Szum, Voorburg; Adrianus G. M. Abel, Capelle aan de Ijssel, both of (NL)

(73) Assignee: DSM N.V., Heerlen (NL)

( * ) Notice: Subject to any disclaimer, the term of this patent is extended or adjusted under 35 U.S.C. 154(b) by 0 days.

(21) Appl. No.: 09/556,430

(22) Filed: Apr. 24, 2000

Related U.S. Application Data

(63) Continuation of application No. 08/690,100, filed on Jul. 31, 1996, now Pat. No. 6,054,217.
(60) Provisional application No. 60/001,817, filed on Aug. 1, 1995.

(51) Int. Cl.[7] ............................ B05D 5/06; B32B 9/00
(52) U.S. Cl. ................. 427/163.2; 427/165; 427/385.5; 427/389.7; 427/500; 427/514; 427/515; 428/392; 385/114
(58) Field of Search ........................ 427/162, 163.2, 427/165, 385.5, 389.7, 500, 514, 515; 428/375, 378, 392; 385/115, 128, 145, 114

(56) References Cited

U.S. PATENT DOCUMENTS

| | | | |
|---|---|---|---|
| 4,900,126 | * | 2/1990 | Jackson et al. .................... 385/115 |
| 4,953,945 | * | 9/1990 | Nishimura et al. ................ 385/115 |
| 5,643,393 | * | 7/1997 | Genovese et al. ................. 156/344 |
| 5,945,173 | * | 8/1999 | Hattori et al. ..................... 427/508 |
| 6,052,503 | * | 4/2000 | Schouten et al. .................. 385/114 |
| 6,054,217 | * | 4/2000 | Szum et al. ....................... 428/392 |
| 6,085,010 | * | 7/2000 | Zahora et al. ..................... 385/114 |
| 6,093,275 | * | 7/2000 | Hinson, II ......................... 156/248 |
| 6,130,980 | * | 10/2000 | Murphy et al. .................... 385/115 |
| 6,195,491 | * | 2/2001 | Jackson et al. .................... 385/114 |

FOREIGN PATENT DOCUMENTS

| | | | |
|---|---|---|---|
| 349206 | * | 1/1990 | (EP) . |
| 614099 | * | 9/1994 | (EP) . |
| WO97/05515 | * | 2/1997 | (WO) . |
| WO98/57209 | * | 12/1998 | (WO) . |

* cited by examiner

Primary Examiner—Cynthia H. Kelly
Assistant Examiner—J. M. Gray
(74) Attorney, Agent, or Firm—Pillsbury Winthrop LLP

(57) ABSTRACT

Provided is an improved optical glass fiber, ribbon unit having the capability of providing mid-span access to individual color-coated optical glass fibers contained therein by application of finger pressure from a human hand. The ribbon unit is made of a plurality of coated optical glass fibers each further coated with a cured color-composition; and a matrix material which binds the plurality of color-coated optical glass fibers together, wherein a bonding force between the cured color-composition and the coated optical glass fibers is greater than a bonding force between said cured color-composition and said matrix material, and wherein the matrix material has been selected or formulated to provide a modulus and Tg sufficiently high such that when opposing pressure is applied to the ribbon unit using the fingers of a human hand, the matrix material buckles and separates from said color-coated optical glass optical fibers instead of compressing and absorbing the opposing pressure. Also provided are a method of making the ribbon unit, and a method of achieving mid-span access to individual color-coated optical glass fibers contained within the ribbon unit.

19 Claims, No Drawings

RIBBON UNIT, A METHOD OF MAKING THE RIBBON UNIT, AND A METHOD OF PROVIDING MID-SPAN ACCESS

This is a continuation of National Appln. No. 08/690,100 filed Jul. 31, 1996 now U.S. Pat. No. 6,054,217.

Priority to the provisional application Ser. No. 60/001,817, filed on Aug. 1, 1995 now abandoned, is claimed. The complete disclosure of the provisional application is hereby incorporated by reference.

1. Field of Invention

The invention relates to an improved ribbon unit containing a plurality of color-coated optical glass fibers bound together in a matrix, which has the capability of easily providing mid-span access to the individual color-coated optical glass fibers. The invention also relates to a method of making the improved ribbon unit. The invention further relates to a method for obtaining mid-span access to the individual color-coated optical glass fibers contained within a ribbon unit.

2. Background of the Invention

For the purpose of multi-channel transmission, ribbon units containing a plurality of optical fibers have been used. A typical ribbon unit is made of a plurality of color-coated optical glass fibers which are bonded together in a matrix material. The optical glass fibers are usually coated with respective colored ink coatings, or a colorant is added to the outer primary coating, so that the individual optical glass fibers can be easily identified from each other.

Optical glass fiber ribbon units provide a modular design which simplifies the construction, installation and maintenance of optical glass fibers by eliminating the need to handle individual optical glass fibers.

When a single optical glass fiber of the ribbon unit is to be fusion connected with an optical glass fiber or with a connector, an end part of the matrix layer can be removed to separate each of the optical glass fibers. It would be advantageous to provide a mid-span access on the ribbon unit. Such a mid-span access would entail being able to easily separate the matrix layer from the optical glass fibers at a point somewhere between the ends of a length of the ribbon unit.

There have been many attempts to provide a ribbon unit in which the matrix material is easily separated from the colored coating present on optical glass fibers at any location on the ribbon unit without removal of the colored coating from the coated optical glass fibers. However, if the separation of the matrix material also removes the colored coating from the fibers, the purpose of individual fiber identification will be negated.

Published European application number 0614099A2 discloses an optical fiber ribbon unit in which the bonding between the coloring layer of the individual optical glass fibers and the matrix layer is suppressed by adding 5% by weight or less of a release agent to each of the layers. The purpose of adding the release agent is to prevent the coloring layer from being peeled off when the matrix material is separated from the optical glass fibers. Examples of such release agents include a silicone release agent or a fluorine-base release layer. While application number 0614099A2 discloses that the silicone resin or oil and the fluororesin or oil can be cured by light or heat, the disclosure in fact teaches against using such light curable release agents. Throughout that disclosure, the release agent is taught as migrating to the surface of the colored layer, and therefore the amount of release agent must be less than 5% by weight and more preferably 3 to 0.7%. to prevent swelling of the resins in the layers. If the release agent was crosslinked, it would not migrate to the surface of the colored coating layer. There is no disclosure or suggestion relating to the release agent cross-linking with the monomers making up the coloring layer.

U.S. Pat. No. 4,900,126 (Jackson) discloses an optical glass fiber ribbon unit in which each of the individually coated optical glass fibers has a colored outer layer. Each of the optical glass fibers is further coated with a release agent which has a low affinity for the bonding material or the colorant material. An example of the release agent is teflon. The release agent creates a weak boundary layer at the interface of the colorant material and the matrix material whereby the matrix can be separated from the optical glass fibers without removing the colored layer on the individual optical glass fibers.

U.S. Pat. No. 4,953,945 discloses using a peelable cured coating layer between an outer colored layer of optical glass fibers and the matrix material whereby the matrix material can be stripped from the optical glass fibers without removing the colored layer of the optical glass fibers.

None of the above ribbon units provide an easy method for obtaining access to the individual coated optical glass fibers at a point between the ends of the ribbon unit (hereinafter "mid-span access"). The above disclosures, at best, only teach ribbon units in which the matrix material can be stripped from the optical glass fibers without removing the colored coating present on the coated optical glass fibers. Using conventional stripping methods, it is very difficult and time consuming to achieve mid-span access. Thus, there is a great need for an improved optical glass fiber ribbon unit having the ability to provide mid-span access more easily and faster than conventional optical glass fiber ribbon units. There is also a great need for an improved method to obtain mid-span access to the individual coated optical glass fibers in an optical glass fiber ribbon unit.

SUMMARY

An objective of the present invention is to provide a novel and improved optical glass fiber ribbon unit which has the capability of providing mid-span access to the individual color-coated optical glass fibers contained within the ribbon unit.

Another objective of the invention it to provide a method for making the improved optical glass fiber ribbon unit.

A further objective of the invention is to provide a novel and improved method of providing mid-span access to the individual color-coated optical glass fibers contained within a ribbon unit.

The above objectives and other objects are obtained by the following.

Surprisingly, it has now been found that by pre-selecting or formulating a specific matrix material having a Tg and modulus according to this invention, preferably in combination with a color-coating having greater adhesion to the coating(s) on the optical glass fiber than to the matrix material, mid-span access to-individual color-coated optical glass fibers can be easily achieved under ambient conditions of normal use.

The invention provides an improved coated optical glass fiber ribbon or cable unit having the capability of providing mid-span access to individual color-coated optical glass fibers contained therein by application of finger pressure from a human hand. The ribbon unit comprises:

a plurality of coated optical glass fibers each further coated with a color-composition; and a matrix material which binds the plurality of color-coated optical glass fibers together, wherein the adhesive bonding force between said cured color-composition and the coating of said coated optical glass fibers is greater than the adhesive bonding force between said cured color-composition and said matrix material, and wherein the matrix material has been pre-selected or formulated so as to provide a modulus and Tg sufficiently high such that the matrix material buckles and separates from said color-coated optical glass fibers when subjected to opposing finger pressure applied transversely to the ribbon, instead of merely compressing and absorbing the opposing pressure.

Also provided is a method of making an optical glass fiber, ribbon unit having the capability of providing mid-span access to individual color-coated optical glass fibers contained therein by application of finger pressure from a human hand. The method comprises the steps of:

providing a plurality of coated optical glass fibers each further coated with a cured color-composition;

pre-selecting or formulating a matrix composition which when suitably cured provides the combination of properties of:

(i) an adhesive bonding force between said cured color-composition and the cured matrix material which is less than the adhesive bonding force between said cured color-composition and said coated optical glass fibers; and (ii) the cured matrix material has a modulus and Tg sufficiently high such that the matrix material buckles and separates from said color-coated optical glass optical fibers upon application of opposing transverse finger pressure to the ribbon unit, instead of merely compressing and absorbing the opposing pressure;

applying said matrix composition to said plurality of color-coated optical glass fibers; and curing said matrix composition to provide said optical glass fiber ribbon unit.

The invention further provides a method of achieving mid-span access on a ribbon unit which comprises a plurality of color-coated optical glass fibers and a matrix material which binds the plurality of color-coated optical glass fibers together. The method comprises the steps of:

squeezing opposing sides of the matrix material with the fingers of a human hand, such as to cause the matrix material to buckle and separate away from the color-coated optical glass fibers, while not removing the color-coating, to provide a loose tubular matrix structure surrounding the color-coated optical glass fibers; and cutting or peeling away a portion of the separated matrix material to expose the individual color-coated glass optical fibers therewithin.

DETAILED DESCRIPTION OF PREFERRED EMBODIMENTS

Optical glass fibers are typically coated with two superposed radiation-cured coatings which together form a primary coating. The coating which contacts the glass fiber is called the inner primary coating and overlaying layer is called the outer primary coating. The term "coated optical glass fiber" as used herein thus refers to an optical glass fiber coated with either an inner primary coating or both an inner and outer primary coating, depending on the type of color-coating used. When a colorant is incorporated into the outer primary coating, the term "coated optical glass fiber" refers to an optical glass fiber coated with an inner primary coating. When the colorant is applied as a separate coating onto the outer primary coating, the term "coated optical glass fiber" refers to an optical glass fiber coated with an inner and outer primary coating. In this manner, the term "color-coating" includes an ink coating applied onto an outer primary coating, as well as an outer primary coating containing a colorant which is applied onto an inner primary coating. Any conventional coated optical glass fibers containing inner and outer primary coatings, and color-coating, can be used to practice this invention.

The novel ribbon unit having the capability of providing mid-span access comprises a plurality of optical glass fibers each coated with an color-composition and a matrix material which surrounds and binds the plurality of color-coated optical glass fibers together. The matrix forming composition (hereinafter "matrix composition") must be such that when the-matrix material is formed the bond between the matrix material and the color-coating must be weaker than the bond between the color-coating and the coated optical glass fiber, whereby when the matrix material is removed the color-coating remains intact on the coated optical glass fiber.

The matrix material can be made by suitably curing any conventional matrix composition which has been adapted to provide (when suitably cured) a Tg and modulus required to provide mid-span access according to the present invention. One skilled in the art knows how to modify radiation-curable coating compositions, including matrix compositions, to provide a desire Tg and modulus. Thus, based on the disclosure provided herein, one skilled in the art will know what Tg and modulus are desired, and such a person will easily be able to formulate a matrix composition which when suitably cured will provide a matrix material having such a Tg and modulus.

The Tg and modulus of the matrix material required to provide mid-span access according to this invention will depend on the bonding force between the matrix layer and the color-coating present on the coated optical glass fibers. The higher the bonding force between the matrix material and the color-coating is, the larger the amount of force that will be required to separate the matrix material from the color-coated optical glass fibers.

Preferably, when suitably cured the matrix material provides a modulus and Tg sufficiently high such that when opposing pressure is applied to the ribbon unit using the fingers of a human hand, the matrix material buckles and separates from the glass optical fibers instead of compressing and absorbing the pressure. In general, the higher the Tg and modulus of the matrix material is, the greater the force will be transmitted from the finger pressure on opposing sections of the matrix material to separate the matrix material from the color-coating and the less the force will be absorbed by compression of the matrix material. Based on the teachings herein, one skilled in the art will easily be able to determine the Tg and modulus of the matrix material required to provide an improved ribbon unit having mid-span access capability according to this invention.

A suitable Tg has been found to be at least about 25° C., more preferably at least about 40° C., and most preferably at least about 60° C. A suitable modulus has been found to be at least about 100 MPa, more preferably, at least about 200 MPa. The modulus and Tg can be measured using the test procedures described herein below.

Preferably, the matrix material itself is provided with a release agent to adjust the bonding force between the matrix material and the color-coating, such that the bonding force between the matrix material and the color-coating is less than the bonding force between the color-coating and the coated optical glass fiber. The matrix release agent can be any conventionally used release agent, for example, one or more, fluorinated oils, Teflon lubricants, silicon resins or oils, and silicon (meth)acrylates. Preferably, the release agent is one or more silicon resins or oils, or silicon (meth)acrylates. Generally, the amount of matrix release agent will be between about 0.5 to about 30% by weight, preferably about 0.8 to about 10% by weight, and more preferably about 1 to about 5% by weight.

Commercial examples of suitable matrix forming compositions include the CABLELITE Matrix Materials sold by Desotech Inc.

Specific examples of matrix compositions which have been formulated to provide a specific Tg and modulus when suitably cured are shown in Tables "Matrix Composition A" and "Matrix Composition B", as follows:

| Component | Weight % |
| --- | --- |
| Matrix Composition A | |
| HEA-IPDI-PPG725-IPDI-HEA | 47.0 |
| Hexanediol diacrylate | 6.0 |
| Isobornyl acrylate | 12.0 |
| Trishydroxyethyl isocyanurate triacrylate | 31.50 |
| 2,4,6-trimethylbenzoyl-diphenylphosphine oxide | 1.50 |
| Thiodiethylene bis (3,5-di-tert-butyl-4-hydroxy) hydrocinnamate | 1.00 |
| Silicone surfactant oil, DC 57 (Dow Corning) | 0.36 |
| Silicone surfactant oil, DC 190 (Dow Corning) | 0.64 |
| Matrix composition B | |
| HEA-TDI-PTMG1000-TDI-HEA | 34.0 |
| Epoxidized soya oil acrylate | 32.0 |
| Bisphenol A Diglycidylether diacrylate | 4.0 |
| Trimethylol propane triacrylate | 18.0 |
| Isodecyl acrylate | 7.0 |
| 2-hydroxy-2-methyl-1-phenyl-propan-1-one | 3.0 |
| Thiodiethylene bis (3,5-di-tert-butyl-4-hydroxy) hydrocinnamate | 1.0 |
| Silicone surfactant oil, DC 57 (Dow Corning) | 0.36 |
| Silicone surfactant oil, DC 190 (Dow Corning) | 0.64 |

HEA = 2-hydroxyethyl acrylate
IPDI = isophorone diisocyanate
PPG725 = 725 molecular weight polypropylene glycol diol
PTMG1000 = 1000 molecular weight polytetramethylene glycol polyol The matrix composition A when suitably cured provides a matrix material having a modulus of about 970 MPa and a glass transition temperature of about 101° C. The matrix composition B when suitably cured provides a matrix material having a modulus of about 270 MPa and a glass transition temperature of about 44° C.

The ribbon unit having the capability of providing mid-span access to individual color-coated optical glass fibers can be made by the following steps. A plurality of coated optical glass fibers each further coated with a cured color-composition is provided. Next, a matrix composition is pre-selected or formulated which when suitably cured provides a cured matrix material having the combination of properties of:

(i) an adhesive bonding force between said cured color-composition and the cured matrix material which is less than the adhesive bonding force between said cured color-composition and said coated optical glass fibers; and (ii) the cured matrix material has a modulus and Tg sufficiently high such that the matrix material buckles and separates from said color-coated optical glass optical fibers upon application of opposing transverse finger pressure to the ribbon unit, instead of merely compressing and absorbing the opposing pressure.

The pre-selected or formulated matrix composition is applied to said plurality of color-coated optical glass fibers and cured to provide the improved optical glass fiber ribbon unit.

The invention further provides a simplified and improved method for providing mid-span access on an optical glass fiber ribbon unit. Pressure is applied on two opposing sections of the above described ribbon unit using the fingers of a hand to force the matrix material to buckle and separate away from the color-coated optical glass fibers. The separated matrix essentially forms a separated tubular matrix structure which surrounds the color-coated optical glass fibers contained therein. The thus separated matrix material can be easily cut or peeled away from the color-coated optical glass fibers.

Either a colorant is added to the outer primary coating or an ink coating is formed on the outer primary coating of the optical glass fiber to obtain a color-coated optical glass fiber. Ink compositions and colorants added to outer primary coatings are now well known in the art. Thus, based on the disclosure provided herein, one skilled in the art will be able to formulate the desired color-composition. The use of an ink coating is preferred.

Preferably, a release agent is present in the ink composition in an amount sufficient to allows buckling and separation of the specific matrix material according to this invention from the optical glass fibers when the ribbon unit is squeezed by finger pressure exerted by a person of average strength.

Examples of suitable ink compositions, which provide a cured color-layer having a greater bonding force to the coated optical glass fiber than to the matrix material, include those described in published European application number 0614099A2 and U.S. Pat. Nos. 4,900,126 and 4,953,945, the complete disclosures of which are herein incorporated by reference. While the ink coating compositions disclosed in these reference are suitable, they are not preferred. These ink compositions contain conventional release agents which can migrate throughout the cured coating. These conventional release agents are suitably used in an amount between about 0.5 to about 10% by weight, preferably about 0.8 to about 5% by weight.

Preferably, the ink composition used is an improved ink composition as described below. The improved ink composition can be based on any known ink composition for coating and identifying coated optical glass fibers, which contains monomers or oligomers that are radiation curable. The known ink compositions will only become the improved ink composition by the addition of the release agent described herein. Commercial examples of suitable ink compositions include the Cablelite LTS UV curable ink series from Desotech Inc which are based on multi-functional acrylate monomers. One skilled in the art will easily be able to determine what known ink compositions are radiation curable.

Preferably, the improved ink composition has a Tg of at least 30° C., more preferably at least 50° C., and most preferably at least 1000° C. when cured. It has been found that increasing the Tg of the cured ink coatings used in ribbon units increases the resistance of the cured ink coating to swelling and/or shrinking caused by the presence of water.

The release agent used to provide the improved ink composition has a functional group which will cross-link with at least one monomer or oligomer present in the ink composition under radiation curing conditions. The selection of the functional group will depend on the monomer or oligomer present in the ink composition. One skilled in the art will easily be able to determine which functional groups will cross-link with the monomer or oligomer present in the ink composition. While not being limited thereto, examples of suitable functional groups are groups containing vinyl, acrylate, methacrylate, maleate, vinyl ether, or acrylamides.

For example, if the ink composition is based on an acrylate or methacrylate monomer, a suitable release agent would be the commercially available silicone acrylates EBECRYL 350 and EBECRYL 1360 (Radcure Industries). Further examples of suitable release agents include the commercially available fluorinated acrylate monomers FX 13 or FX 14 (3M Inc.).

Alternatively, based on the teachings herein, one skilled in the art will be able to modify known release agents to include the required functionality. For example, a known release agent provided with hydroxy functionality can be reacted with an isocyanate and hydroxyethylacrylate to provide acrylate functionality, or isocyanate and hydroxybutylvinylether to provide vinyl ether functionality.

The ability of the ribbon unit to provide mid-span access to the individual coated optical glass fibers is dependent upon how fast the improved ink composition is cured. At higher line curing speeds, more release agent is required to provide a ribbon unit having mid-span access using the simplified method described herein. If a slower curing speed is desired, less release agent can be used to provide a ribbon unit having mid-span access.

The preferred radiation-curable release agent should be present in an amount to provide an optical glass fiber ribbon unit which has mid-span access capability. The amount of release agent will depend on the selection of the matrix material and the ink composition to which the release agent is added. Generally, the amount of release agent will be between about 1.5 to about 30% by weight, preferably about 2 to about 10% by weight, and more preferably about 3 to about 5% by weight.

As now used according to this invention, the preferred radiation-curable release agent can be present in large amounts because it cross-links with the "at least one monomer or oligomer" present in the ink composition. Not wishing to be bound by any theory, it is believed that when the release agent is cross-linked with monomer or oligomer during curing of the improved ink composition, the release agent is prevented from migrating or bleeding to the surface of the ink coating formed.

The amount of release agent is preferably the minimum amount required to provide mid-span access using the simplified method described herein. Such minimum amount can easily be determined by making test runs of ribbon units in which the amount of release agent present in the improved ink composition is varied. The lowest amount of release agent present which provides mid-span access to the optical glass fibers at the highest inking/ribboning line speeds is the preferred amount.

The invention will be further explained by the following non-limiting examples.

EXAMPLE 1

CABLELITE LTS ink compositions (Desotech, Inc.) were modified by adding EBECRYL 350 or EBECRYL 1360 (silicone acrylate). The modified ink compositions were applied to coated optical glass fibers and cured using UV light. The cured ink-coated optical glass fibers were then coated with a CABLELITE Matrix Material having the composition shown in the following Table 1, and cured to produce a ribbon unit. The Tg of the cured matrix material 69° C. and the modulus was 1080 MPa.

TABLE 1

| Component | Weight % |
| --- | --- |
| HEA-TDI-PTMG1000-TDI-HEA[1] | 38.62 |
| Bisphenol A diglycidylether diacrylate | 28.72 |
| Hexanediol diacrylate | 7.92 |
| Isobornyl acrylate | 9.9 |
| Phenoxy ethyl acrylate | 10.89 |
| 2,4,6-trimethyl-benzoyldiphenyl-phosphine oxide | 1.98 |
| Bis (1,2,2,6,6-pentamethyl-4-piperidinyl) sebacate | 0.49 |
| Ethylene bis(oxy-ethylene) bis (3-tert-butyl-4-hydroxy-5-methylhydrocinnamate | 0.49 |
| Silicone Surfactant, DC 57 (Dow Corning) | 0.35 |
| Silicone Surfactant, DC 190 (Dow Corning) | 0.64 |

[1]hydroxyethylacrylate, toluenediisocyanate, and polytetramethyleneglycol (1000 MW).

The amounts of EBECRYL and the type of ink composition used are shown in the following Table 2.

TABLE 2

| Desotech Product No. | Type of Release Agent | Amount of Release Agent Added (parts)[4] | Mid-Span Access |
| --- | --- | --- | --- |
| 3287-11-OA[2] | EBECRYL 350[3] | 50 | yes |
| 3287-11-26[2] | EBECRYL 350 | 50 | yes |
| 3287-11-31[2] | EBECRYL 350 | 50 | yes |
| 3287-11-32[2] | EBECRYL 350 | 50 | yes |
| 3287-11-OA[2] | EBECRYL 1360 | 50 | yes |
| 3287-11-26[2] | EBECRYL 1360 | 50 | yes |
| 3287-11-31[2] | EBECRYL 1360 | 50 | yes |
| 3287-11-32[2] | EBECRYL 1360 | 50 | yes |
| all LTS[2] colors | none | none | no |

[2]CABLELITE LTS ink compositions commercially sold by Desotech, Inc.
[3]Silicone acrylate compositions commercially sold by Radcure Specialties, Inc.
[4]The parts of release agent added per 1000 parts of ink composition.

Mid-span access was tested by applying finger pressure to opposing sections of the ribbon units. If the matrix material separated from the coated optical glass fibers to form a separated tubular matrix material surrounding the coated optical glass fibers contained therein, mid-span access was achieved.

The data shown in Table 2 demonstrates that the use of silicone acrylate, commercially sold by Radcure Specialties, Inc., as a release agent in the improved ink composition, which is cured at typical industrial line-curing speeds, in conjunction with silicone or silicone acrylate in the matrix material, provides a ribbon unit having mid-span access. There is at present no known commercial ribbon unit which provides this behavior.

EXAMPLE 2

The effect of Tg on the water sensitivity of the cured ink coating compositions was determined. The ink coating compositions shown in the following Table 3 were cured and tested for water sensitivity.

TABLE 3

| Desotech Product No. | Additional Components | Tg of Cured Coating (° C.) | Dried Weight Change (%) | Average Dimensional Change (%) |
|---|---|---|---|---|
| 3287-11-0 LTS[4] (Sample 1) | None | >100 | −2.1 | −.6 |
| 3287-11-0 LTS[4] | 4.76% by weight of EBECRYL 350 | >100 | −2.4 | −.8 |
| 3287-11-0 LTS[4] (Sample 2) | None | >100 | −1.83 | −.94 |
| 950-374 LTM[5] | None | 25 | −12.67 | −4.64 |

[4]CABLELITE LTS ink compositions commercially sold by Desotech, Inc.
[5]CABLELITE LTM ink compositions commercially sold by Desotech, Inc.

These test results demonstrate that as the Tg of the ink composition is increased, the resistance to dimensional changes and weight loss caused by water increases. Thus, a coating made by curing the Cablelite LTS (Tg>100° C.) inks will be less prone than a coating made by curing CABLELITE LTM (Tg=25° C.) to dimensional and weight changes caused by water. The average dimension change shown in Table 3 is the average change in length of each of two sides of approximately a 2 inch by 2 inch drawdown of the cured ink composition.

Test Procedures

Modulus

The modulus was measured using a universal testing instrument, Instron Model 4201 equipped with a personal computer and software "Series IX Materials Testing System." The load cells used were 2 and 20 pound capacity. The ASTM D638M was followed, with the following modifications:

A drawdown of the material to be tested was made on a glass plate and cured using a UV processor. The cured film was conditioned at 23+2° C. and 50±5% relative humidity for a minimum of sixteen hours prior to testing.

A minimum of eight test specimens, having a width of 0.5±0.002 inches and a length of 5 inches, were cut from the cured film. To minimize the effects of minor sample defects, sample specimens were cut parallel to the direction in which the drawdown of the cured film was prepared. If the cured film was tacky to the touch, a small amount of talc was applied to the film surface using a cotton tipped applicator.

The test specimens were then removed from the substrate. Caution was exercised so that the test specimens were not stretched past their elastic limit during the removal from the substrate. If any noticeable change in sample length had taken place during removal from the substrate, the test specimen was discarded.

If the top surface of the film was talc coated to eliminate tackiness, then a small amount of talc was applied to the bottom surface of test specimen after removal from the substrate.

The average film thickness of the test specimens was determined. At least five measurements of film thickness were made in the area to be tested (from top to bottom) and the average value used for calculations. If any of the measured values of film thickness deviated from the average by more than 10% relative, the test specimen was discarded. All specimens came from the same plate.

The appropriate load cell was determined by using the following equation:

$$[A \times 145] \times 0.0015 = C$$

Where: A=Product's maximum expected tensile strength (MPa); 145=Conversion Factor from MPa to psi; 0.00015=approximate cross-sectional area (in$^2$) of test specimens; and C=lbs. The 2 pound load cell was used for materials where C=1.8 lbs. The 20 pound load cell was used for materials where 1.8<C<18 lbs. If C>19, a higher capacity load cell was required.

The crosshead speed was set to 1.00 inch/min, and the crosshead action was set to "return at break". The crosshead was adjusted to 2.00 inches jaw separation. The air pressure for the pneumatic grips was turned on and adjusted as follows: set approximately 20 psi(1.5 Kg/cm$^2$) for primary optical fiber coatings and other very soft coatings; set approximately 40 psi(3Kg/cm$^2$) for optical fiber single coats; and set approximately 60 psi(4.5 Kg/cm$^2$) for secondary optical fiber coatings and other hard coatings. The appropriate Instron computer method was loaded for the coating to be analyzed.

After the Instron test instrument had been allowed to warm-up for fifteen minutes, it was calibrated and balanced following the manufacturer's operating procedures.

The temperature near the Instron Instrument was measured and the humidity was measured at the location of the humidity gage. This was done just before beginning measurement of the first test specimen.

Specimens were analyzed under such conditions that the temperature was within the range 23±1.0° C. and the relative humidity was within 50±5%. The temperature was within this range for each test specimen. The humidity value was verified at the beginning and the end of testing a set of specimens from one plate.

Each test specimen was tested by suspending it into the space between the upper pneumatic grips such that the test specimen was centered laterally and hanging vertically. Only the upper grip was locked. The lower end of the test specimen was pulled gently so that it has no slack or buckling, and it was centered laterally in the space between the open lower grips. While holding the specimen in this position, the lower grip was locked.

The sample number was entered and sample dimensions into the data system, following the instructions provided by the software package.

The temperature and humidity were measured after the last test specimen from the current drawdown was tested. The calculation of tensile properties was performed automatically by the software package.

The values for (secant or segment) modulus were checked to determine whether any one of them deviated from the average enough to be an "outlier." If the modulus value was an outlier, it was discarded. If there were less than six data values for the tensile strength, then the entire data set was discarded and repeated using a new plate.

Tg

The Tg was measured using a Rheometrics Solids Analyzer (RSA-11), equipped with: 1) A personal computer having MS-DOS 5.0 operating system and having Rhios® software (Version 4.2.2 or later) loaded; 2) A liquid nitrogen controller system for low-temperature operation.

The test samples were prepared by casting a film of the material, having a thickness in the range of 0.02 mm to 0.4 mm, on a glass plate. The sample film was cured using a UV processor. A specimen approximately 35 mm (1.4 inches) long and approximately 12 mm wide was cut from a defect-free region of the cured film. For soft films, which tend to have sticky surfaces, a cotton-tipped applicator was used to coat the cut specimen with talc powder.

The film thickness of the specimen was measured at five or more locations along the length. The average film thickness was calculated to ±0.001 mm. The thickness was not allowed to vary by more than 0.01 mm over this length. Another specimen was taken if this condition was not met. The width of the specimen was measured at two or more locations and the average value calculated to ±0.1 mm.

The geometry of the sample was entered into the instrument. The length field was set at a value of 23.2 mm and the measured values of width and thickness of the sample specimen were entered into the appropriate fields.

Before conducting the temperature sweep, moisture was removed from the test samples by subjecting the test samples to a temperature of 80° C. in a nitrogen atmosphere for 5 minutes. The temperature sweep used included cooling the test samples to about −60° C. or about −80° C. and increasing the temperature at about 1°/minute until the temperature reached about 60° C. to about 70° C. The test frequency used was 1.0 radian/second.

Elastic modulus and loss modulus points were measured at about 2° C. As used herein, the glass transition temperature (Tg) is defined as the temperature at the maximum value of the loss modulus divided by the elastic modulus.

Dynamic Water Sensitivity

The water soak extraction and absorption were measured using the following procedure. A drawdown of each material to be tested was made at a film thickness of about 150 microns (8 mils) on a glass plate and cured. The cured film was cut to form three sample specimens, approximately 3 cm×3 cm (1½×1½), on the glass plate. The glass plate containing the three sample specimens was heated at 60° C. for one hour and then placed in a desiccator for 15 minutes.

125 ml (4 oz.) of deionized or distilled water was poured into three 125 ml (4 oz.) glass jars, maintained at a temperature of 23±2° C. Each of the sample specimens were removed from the glass plate and weighed on an analytical balance using corrugated Teflon paper to prevent sticking. Each sample specimen was then placed into one of the jars of water.

The sample specimens were soaked in the water for 30 minutes and then removed from the glass jars. The water remaining on the surface of the sample specimens was removed by blotting them with lint free wiping tissue.

The samples were reweighed as above and placed back into their respective jars.

The above procedure was repeated at 1, 2, 3, and 24 hours, and at 7 and 14 days.

At 21 days, the sample specimens were removed from the glass jars and reweighed as above. The sample specimens were placed onto a glass plate and heated at 60° C. for one hour, and then placed in a desiccator for 15 minutes. The sample specimens were reweighed as before.

The percent weight change at each time interval for each sample specimen was determined. The values for the three sample specimens at each time interval were averaged. The water absorption reported is the largest, positive average percent weight change.

The water extraction for each sample specimen was determined by dividing the difference of the initial and 21-day dried weights by the initial dried weight and multiplying by 100. The reported value is the average of the three sample specimen values.

The total water sensitivity is the sum of the absolute values of the water absorption and the water extraction.

We claim:

1. A method of making an optical glass fiber, ribbon unit having the capability of providing mid-span access to individual color-coated optical glass fibers contained therein by application of finger pressure from a human hand, the method comprising the steps of:

providing a plurality of coated optical glass fibers each further coated with a cured color-composition;

pre-selecting or formulating a matrix composition which when suitably cured provides the combination of properties of:
  (i) an adhesive bonding force between said cured color-composition and the cured matrix material which is less than the adhesive bonding force between said cured color-composition and said coated optical glass fibers; and
  (ii) the cured matrix material has a modulus and Tg sufficiently high such that the matrix material buckles and separates from said color-coated optical glass optical fibers upon application of opposing transverse finger pressure to the ribbon unit, instead of merely compressing and absorbing the opposing pressure;

applying said matrix composition to said plurality of color-coated optical glass fibers; and curing said matrix composition to provide said optical glass fiber ribbon unit.

2. A method according to claim 1, further comprising the step of pre-selecting or formulating the matrix composition to provide a cured matrix material having Tg of least about 25° C.

3. A method according to claim 1, further comprising the step of pre-selecting or formulating the matrix composition to provide a cured matrix material having Tg of least about 40° C.

4. A method according to claim 1, further comprising the step of selecting or formulating the matrix composition to provide a cured matrix material having Tg of least about 60° C.

5. A method according to claim 1, further comprising the step of selecting or formulating the matrix composition to provide a cured matrix material having a modulus of at least about 100 MPa.

6. A method according to claim 1, further comprising the step of selecting or formulating the matrix composition to provide a cured matrix material having a modulus of at least about 200 MPa.

7. A method according to claim 1, wherein the color-coating has been made from an improved ink composition, which in uncured form comprises:

a radiation-curable ink composition containing at least one radiation-curable monomer or oligomer; and a release agent having a functional group cross-linkable with said at least one monomer or oligomer.

8. A method according to claim 7, wherein the functional group cross-linkable with the at least one monomer or oligomer is selected from the functional groups consisting of vinyl, acrylate, methacrylate, maleate, vinyl ether, or acrylamides.

9. A method according to claim 7, wherein the release agent comprises silicone acrylate.

10. A method according to claim 7, wherein the ink composition is adapted to provide a cured ink having a Tg of at least 30° C.

11. A method according to claim 7, wherein the ink composition is adapted to provide a cured ink having a Tg of at least 50° C.

12. A method according to claim 7, wherein the ink composition is adapted to provide a cured ink having a Tg of at least 100° C.

13. A method according to claim 1, further comprising the step of selecting or formulating the matrix composition to contain a release-agent.

14. A method according to claim 1, further comprising the step of selecting or formulating said matrix composition which comprises:

at least one radiation-curable monomer or oligomer; and a release agent having a functional group cross-linkable with said at least one monomer or oligomer.

15. A method according to claim 14, wherein the functional group cross-linkable with the at least one monomer or oligomer is selected from the functional groups consisting of vinyl, acrylate, methacrylate, maleate, vinyl ether, and acrylamides.

16. A method according to claim 14, wherein the release agent comprises silicone acrylate.

17. A method according to claim 14, wherein a release agent is incorporated in the matrix composition in an amount of between about 0.5 to about 30% by weight.

18. A method of achieving mid-span access on a ribbon unit which comprises a plurality of color-coated optical glass fibers and a matrix material which binds the plurality of color-coated optical glass fibers together, the method comprising the steps of:

squeezing opposing sides of the matrix material with the fingers of a human hand, such as to cause the matrix material to buckle and separate away from the color-coated optical glass fibers, while not removing the color-coating, to provide a loose tubular matrix structure surrounding the color-coated optical glass fibers; and cutting or peeling away a portion of the separated matrix material to expose the individual color-coated glass optical fibers therewithin.

19. The method according to claim 18, wherein the matrix material when suitably cured provides a modulus and Tg sufficiently high such that when subjected to opposing finger pressure applied transversely to the ribbon unit, the matrix material buckles and separates from the color-coated optical glass fibers instead of merely compressing and absorbing the opposing pressure.

* * * * *